(12) United States Patent
Klammer et al.

(10) Patent No.: US 12,115,708 B2
(45) Date of Patent: Oct. 15, 2024

(54) APPARATUS AND METHOD FOR DEGASSING A PLASTICIZED MATERIAL

(71) Applicant: ENGEL AUSTRIA GmbH, Schwertberg (AT)

(72) Inventors: Guenther Klammer, Aschbach Markt (AT); Thomas Koepplmayr, Marchtrenk (AT)

(73) Assignee: ENGEL AUSTRIA GmbH, Schwertberg (AT)

( * ) Notice: Subject to any disclaimer, the term of this patent is extended or adjusted under 35 U.S.C. 154(b) by 268 days.

(21) Appl. No.: 17/714,358

(22) Filed: Apr. 6, 2022

(65) Prior Publication Data
US 2022/0324146 A1  Oct. 13, 2022

(30) Foreign Application Priority Data
Apr. 7, 2021 (AT) .............................. A 50251/2021

(51) Int. Cl.
| | |
|---|---|
| B29C 45/63 | (2006.01) |
| B29B 7/42 | (2006.01) |
| B29B 7/48 | (2006.01) |
| B29B 7/84 | (2006.01) |

(52) U.S. Cl.
CPC ............. B29C 45/63 (2013.01); B29B 7/426 (2013.01); B29B 7/483 (2013.01); B29B 7/847 (2013.01)

(58) Field of Classification Search
CPC ....... B29C 45/63; B29C 48/767; B29B 7/847; B29B 7/426; B29B 7/845
See application file for complete search history.

(56) References Cited

U.S. PATENT DOCUMENTS

| | | |
|---|---|---|
| 3,702,226 A | 1/1971 | Kim et al. |
| 3,835,209 A | 9/1974 | Karabedian |
| 3,913,796 A | 10/1975 | Aoki |
| 4,011,170 A | 3/1977 | Pickin et al. |
| 4,533,308 A | 8/1985 | Cloeren |
| 4,600,550 A | 7/1986 | Cloren |
| 4,678,423 A | 7/1987 | Bertolotti |
| 4,711,602 A | 12/1987 | Baker |

(Continued)

FOREIGN PATENT DOCUMENTS

| | | |
|---|---|---|
| CN | 1914233 | 2/2007 |
| CN | 104924573 | 9/2015 |

(Continued)

OTHER PUBLICATIONS

Translation of WO-2021074340-A1 (Year: 2021).*
Translation of CN-110394966-A (Year: 2019).*

*Primary Examiner* — John J DeRusso
(74) *Attorney, Agent, or Firm* — Wenderoth, Lind & Ponack, L.L.P.

(57) ABSTRACT

Apparatus for degassing a plasticizable material, wherein the apparatus has at least one passage having a inlet opening for the feed of the material in the plasticized state. Provided downstream of the at least one passage in the flow direction of the plasticized material is a plurality of substantially parallelly arranged partial passages so that a material flow flowing through the passage is split up into partial flows by the partial passages, and the partial passages open into a free space so that the material expands in the free space, wherein at least one of the partial passages has a taper.

30 Claims, 5 Drawing Sheets

(56) References Cited

U.S. PATENT DOCUMENTS

| | | |
|---|---|---|
| 4,792,424 A | 12/1988 | Loman |
| 4,942,010 A | 7/1990 | Baker |
| 5,357,784 A | 10/1994 | Collier |
| 5,486,333 A | 1/1996 | Mavridis et al. |
| 6,015,227 A | 1/2000 | Fogarty |
| 6,062,718 A | 5/2000 | Fogarty |
| 6,132,077 A | 10/2000 | Fogarty |
| 6,390,797 B1 | 5/2002 | Myers |
| 6,595,765 B1 | 7/2003 | Lengerich et al. |
| 6,609,818 B1 | 8/2003 | Fogarty |
| 6,805,820 B1 | 10/2004 | Myers |
| 7,060,788 B2 | 6/2006 | Hucks et al. |
| 8,870,563 B2 | 10/2014 | Belzile |
| 10,093,034 B2 | 10/2018 | Ahlgrimm |
| 11,465,322 B2 | 10/2022 | Kastner et al. |
| 11,548,196 B2 | 1/2023 | Yokoyama |
| 11,571,845 B2 | 2/2023 | Kastner |
| 2005/0197489 A1 | 9/2005 | Hucks et al. |
| 2013/0344188 A1 | 12/2013 | Belzile |
| 2015/0266208 A1 | 9/2015 | Ahlgrimm |
| 2019/0329470 A1 | 10/2019 | Kastner et al. |
| 2020/0316838 A1 | 10/2020 | Kastner |
| 2021/0129402 A1 | 5/2021 | Yokoyama |
| 2021/0260801 A1 * | 8/2021 | Morikawa ............... B29B 7/286 |
| 2022/0134626 A1 | 5/2022 | Gneuss et al. |
| 2024/0092009 A1 | 3/2024 | Mielke et al. |

FOREIGN PATENT DOCUMENTS

| | | | |
|---|---|---|---|
| CN | 110394956 | | 11/2019 |
| CN | 110394966 A | * | 11/2019 |
| DE | 2 120 601 | | 11/1972 |
| DE | 2355187 | | 11/1973 |
| DE | 36 37 775 | | 5/1988 |
| DE | 103 57 183 | | 6/2005 |
| DE | 20 2019 105 681 | | 2/2021 |
| EP | 0 663 277 | | 7/1995 |
| GB | 442968 | | 2/1936 |
| GB | 1 375 237 | | 4/1972 |
| GB | 1 414 507 | | 11/1972 |
| GB | 1 493 559 | | 4/1976 |
| JP | S60124232 | | 7/1985 |
| JP | 6728462 | | 7/2020 |
| WO | 85/003027 | | 7/1985 |
| WO | 2012/125380 | | 9/2012 |
| WO | 2016/091660 | | 6/2016 |
| WO | 2021/008659 | | 1/2021 |
| WO | WO-2021074340 A1 * | 4/2021 | ......... B29C 48/0255 |

* cited by examiner

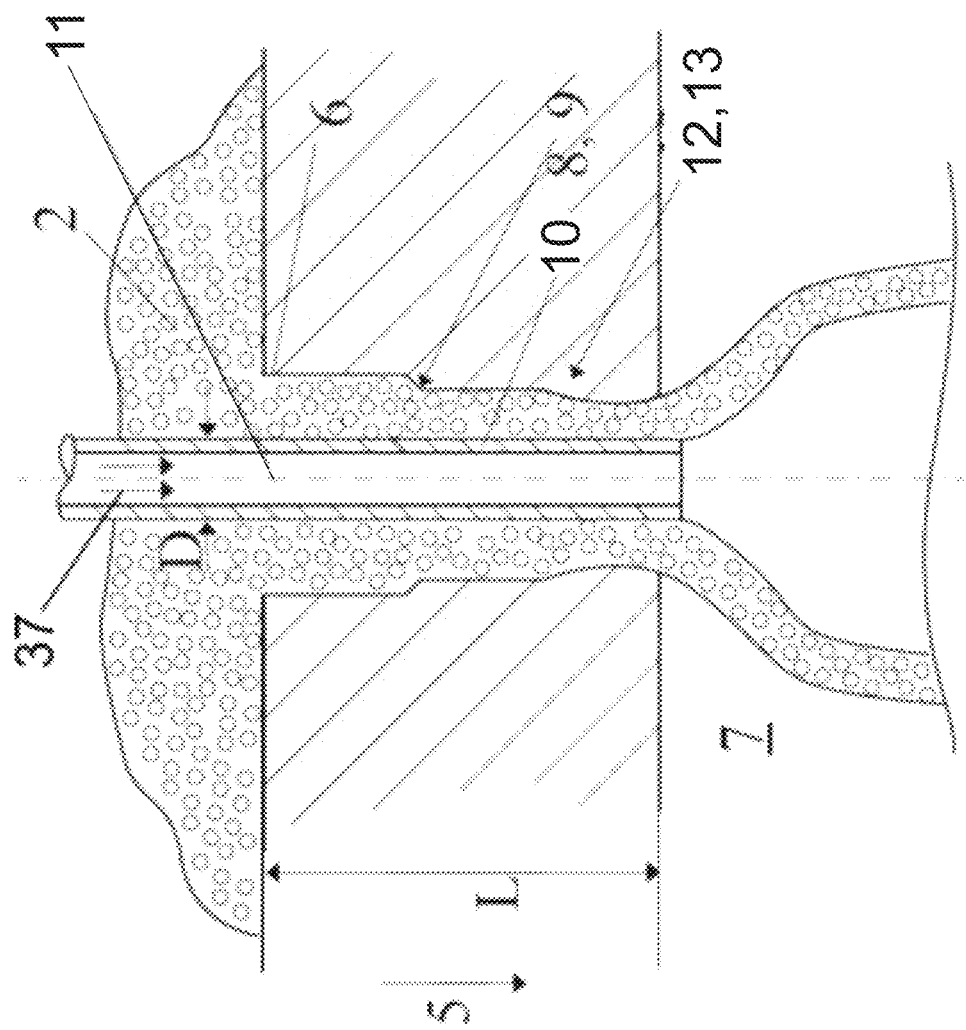

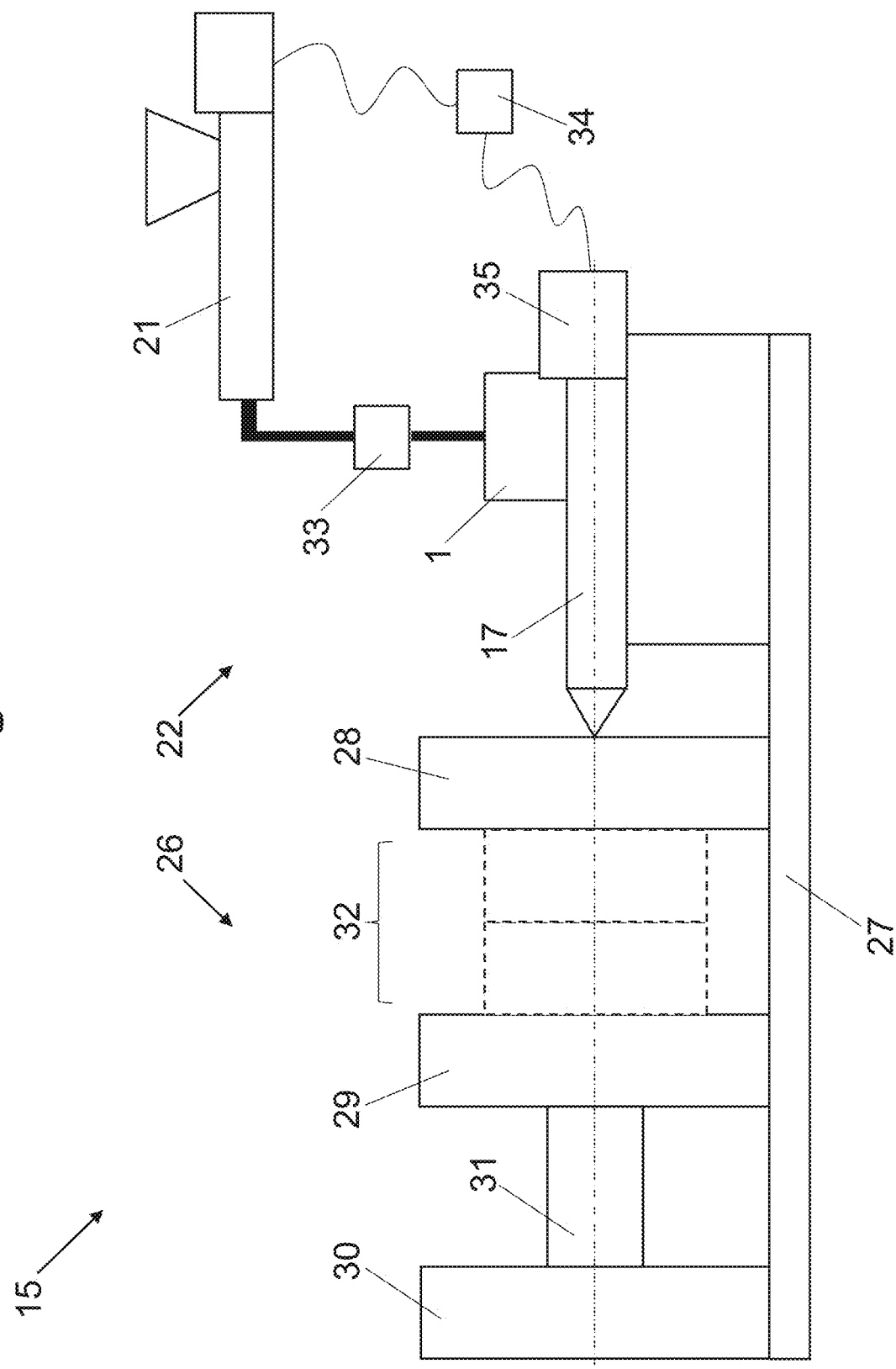

APPARATUS AND METHOD FOR DEGASSING A PLASTICIZED MATERIAL

BACKGROUND OF THE INVENTION

The present invention concerns an apparatus for degassing a plasticized material, a plasticizing unit and a shaping machine having such an apparatus, as well as a method of degassing a plasticized material.

The term shaping machines can be used to denote injection molding machines, injection presses, presses and the like. Shaping machines in which the plasticized material is fed to an open mold tool can certainly be envisaged.

The state of the art is to be outlined hereinafter by reference to an injection molding machine. A similar consideration applies generally to shaping machines.

Apparatuses of the general kind set forth for degassing a plasticized material include:
at least one passage having a degassing opening for the feed of the material in the plasticized state,
provided downstream of the at least one passage in the flow direction of the plasticized material a plurality of substantially parallel arranged partial passages so that a material flow flowing through the passage is split up into partial flows by the partial passages, and
a free space into which the partial passages open so that the material expands in the free space and falls freely.

Such apparatuses are mostly used in compound and recycling applications of injection molding machines.

In corresponding applications firstly a plastic which is to be recycled or put to use (hereinafter referred to generally as a plasticizable material) is plasticized by way of a plasticizing unit. Such plasticizing units are mostly in the form of single-screw or multi-screw extruders (also referred to as single-shaft or multi-shaft extruders).

That plasticized material is then fed to an injection unit of an injection molding machine in order to put the plasticized (recycled) material into a fresh form and thus put it to a new purpose of use.

Naturally, other possible ways of further processing are also possible. Thus, the plasticized material can be fed for example to a continuous strand casting operation, an injection press, a press, a semi-finished product production and the like and further processed by means thereof.

What is problematical however in regard to the compound or recycling application is that after plasticization the plasticized material still bears unwanted gases and inclusions in gas form, which results in a lower component quality upon further processing.

It is therefore known from the state of the art for the plasticized material to be degassed prior to the further processing operation and thus to remove unwanted gases from the melt as well as possible.

It is known for the plasticized material to be passed for example through apertured plates which divide up the strand of plasticized material and thus liberate inclusions (gas inclusions) in the strand of the plasticized material to the environment whereby the gases can be carried away.

The step of "cutting up" a strand of plasticized material by means of projections is also known from the state of the art, whereby once again inclusions in the strand of plasticized material are to be extracted and can be removed from the plasticized material.

Corresponding apparatuses are known for example from DE 2120601 A1 and DE 10357183 A1.

However corresponding known apparatuses from the state of the art only allow a limited possible option in terms of degassing a plasticized material so that high levels of gas residues always still remain in the plasticized material and nonetheless there is an increased potential in regard to the quality of the plasticized material and the components subsequently produced therefrom.

SUMMARY OF THE INVENTION

The object of the present invention is to provide an apparatus and a method of degassing a plasticized material, in which it is possible to ensure better and/or higher degassing of a plasticized material.

That object is attained by an apparatus for degassing a plasticized material as described below, a plasticizing unit and a shaping machine having such an apparatus, as well as a method of degassing a plasticized material.

According to the invention, an apparatus for degassing a plasticizable material
has at least one passage having an inlet opening for the feed of the material in the plasticized state,
provided downstream of the at least one passage in the flow direction of the plasticized material are a plurality of substantially parallel arranged partial passages so that a material flow flowing through the passage is split up into partial flows by the partial passages, and
the partial passages open into a free space so that the material expands in the free space,
wherein at least one of the partial passages has a taper.

When the plasticized material passes into the free space expansion occurs, by which the pressure in the material drops and whereby gases dissolved in the material issue/escape from the solution and are separated from the plasticized material.

Thus, it is possible to arrive at extraction of the gases dissolved in the plasticized material in an improved fashion by means of a structure according to the invention.

An increased pressure already occurs due to the partial passages, but that is enhanced by the taper (and preferably by the further taper and/or the recess and/or the mandrel), and that additionally enhances the phenomenon of strand enlargement of the plasticized material when issuing from the partial passages (whereby degassing is promoted).

The present invention is based on the knowledge of rheology whereby plasticized materials (particularly preferably thermoplastic materials), after passing through constricted cross-sections, experience strand enlargement whereby the surface of the plasticized material breaks up and gases dissolved in the plasticized material can thus issue from the plasticized material.

That flow characteristic of plasticized materials, preferably polymer melts, is based on the viscoelastic behavior, viscous flow and elastic deformation of the plasticized material when passing through the taper in at least one flow passage.

An apparatus according to the invention or a method according to the invention can also be used in already known structural variants in the state of the art, as also described for example by the preamble to the description, and can be subsequently installed.

The free space can preferably have a length of 5 mm—measured along a flow direction of the plasticized material through the free space.

The at least one taper has a conical region—which preferably tapers in the flow direction of the plasticized material—and/or a rounded-off recess.

The term recess is used to denote a portion of a partial passage which firstly has a taper or constriction (however shaped) and then in flow relationship an enlargement (however shaped).

As mentioned, the recess can preferably be rounded, in which respect in principle it is also possible according to the invention to use recesses which are shaped differently.

The tapering region can be in the form of a region with a linearly narrowing cross-section of the at least one partial passage (as can be implemented for example by a conical tapering) or the tapering region tapers non-linearly along the flow direction of the plasticized material (that is to say the cross-sectional area of the at least one partial passage reduces non-linearly—preferably in accordance with a hyperbolic function—along a flow direction).

In the same manner, a subsequent enlargement can expand linearly or non-linearly along the flow direction (in which case the cross-sectional area can increase along the flow direction linearly or non-linearly—preferably in accordance with a hyperbolic function).

Thus for example the diameter of a circular cross-sectional area of the at least one partial passage can decrease non-linearly (preferably hyperbolically) along the flow direction of the plasticized material. Also, a cross-sectional area of the at least one partial passage decreases non-linearly (preferably hyperbolically) along the flow direction of the plasticized material.

A similar consideration applies for the enlargement in the case of a recess.

The configuration of the non-linear reduction or increase in the cross-sectional area of the at least one partial passage along the flow direction of the plasticized material (both in relation to a narrowing region and also in relation to a recess) can be such that the plasticized material has a constant strain rate when flowing through along the flow direction.

Corresponding configurations of recesses and/or narrowing regions to keep a strain rate of a flowing fluid constant are known from the state of the art from U.S. Pat. No. 5,357,784.

At least one of the partial passages can have at least one—preferably centrally arranged—mandrel which is oriented substantially parallel to a longitudinal axis of the at least one of the partial passages. The mandrel can also be referred to as the "torpedo".

A gap (preferably an annular gap) can be formed between the at least one mandrel and the at least one partial passage—at least in the region of the mouth opening of the at least one partial passage into the free space —, which gap is of a gap size of 0.05 mm to 3 mm, particularly preferably 0.5 mm to 1 mm. The gap size in that case is to be interpreted as the smallest spacing between the at least one mandrel and an inside wall of the at least one partial passage.

Preferably, the at least one mandrel can be mounted moveably along the longitudinal axis and is moveable and/or can be arrested in its position, wherein preferably a gap size of the gap can be set in a range of 0.05 mm to 3 mm.

Preferably, lateral surfaces project from the at least one mandrel along the flow direction of the plasticizable material, preferably in the flow direction at the end of the at least one mandrel.

The strand enlargement of the strand of plasticized material can be additionally promoted by the enlargement of the mandrel in the flow direction or by the provision of lateral surfaces, by the strand being pressed open from the inside by the mandrel.

The at least one mandrel can have a region in which a cross-section of the at least one mandrel enlarges along the flow direction of the plasticized material.

The lateral surface or surfaces can be arranged in a fin form on the mandrel so that the lateral surface or surfaces for example at least partially cut open the guided strand to permit gas bubbles to escape.

Preferably, the at least one mandrel has at least one injection nozzle device, wherein a fluid, preferably a gas, can be fed to the plasticized material by way of the at least one injection nozzle device.

Such an injection nozzle device can be implemented for example by a tubular configuration of the at least one mandrel. Alternatively a plurality of passages can be provided in the at least one mandrel, the passages preferably being oriented parallel to the longitudinal axis.

The feed of gases by way of the at least one mandrel can provide that "swelling" (or also expansion into the free space) of the plasticized material on issuing from the partial passage can be additionally promoted or enhanced.

Additives (for example in the form of a propellant gas) can be fed into the plasticized material by the injection of gases by way of the at least one mandrel, like for example aromatic substances or entrainment agents which bind unwanted gases dissolved in the plasticized material. By way of example it is possible to use active gases like $CO_2$ to bind fragrances dissolved in the plasticized material.

It would also be possible, for example, to supply fluid additives or additions (like hardener, plasticizer, dyestuffs and so forth) by way of an injection nozzle device of the at least one mandrel, in which case this would give the substantial advantage that the plasticized material encloses the supplied liquid additive or addition (which for example is advantageous on the one hand for mixing of the plasticized material with the fluid additive or addition and on the other hand prevents uncontrolled spread—splashing around—of the fluid additives or addition in the feed in the free space).

Preferably, the at least one partial passage has a further taper.

The above-described advantage of a taper for degassing can be even further enjoyed by the provision of a further taper.

Naturally all the described embodiments of the taper and the further taper can be correspondingly used for the further taper or for the taper.

The at least one further taper can have a conical region and/or a rounded recess.

The basic notion of the optional measures of a further taper, a recess and/or a mandrel is that of still further loading the plasticized material, which is already viscoelastically loaded, shortly before passing into the free space.

Besides the (static) preloading which occurs in any case in the partial passages there is in addition thereto shortly before passing into the free space a dynamic loading which, by virtue of the non-linear properties of the plasticized material, produces an over-proportional additional strand enlargement in the free space. That results in veritable bursting of the plasticized material in the free space, which increases the effectiveness of degassing by a multiple.

Preferably, the conical taper narrows in the flow direction along the partial passage and thus reduces its cross-section.

A—preferably sharp-edged—projection can be arranged transversely to the flow direction in the free space of the feed device downstream in the flow direction of at least one partial passage.

Such a projection in the free space of the feed device can be used to provide that it cuts into the expanded strand of the plasticized material and thus cuts the strand open like a knife so that degassing can be additionally effected.

The at least one free space can be gas-tight in relation to an environment of the apparatus. With a corresponding gas-tight configuration, the interior of the free space can be connected to a suction removal device (for example a vacuum pump), wherein the suction removal device is adapted to suck gases out of the interior of the free space.

Alternatively, the at least one free space is not gas-tight in relation to an environment of the apparatus and the gases which are present or which occur and which escape in the free space escape of their own accord.

Alternatively or additionally, the partial passages and/or the free space can be air-tight or sealed in relation to the plasticized material with respect to the environment.

The at least one partial passage is at least partially vertically oriented.

Preferably, the at least one partial passage has a minimum diameter (for example a bore diameter) of 0.2 mm to 10 mm, preferably 0.3 mm to 5 mm, particularly preferably 0.5 mm to 3 mm.

The at least one partial passage can have a minimum cross-sectional area of 0.032 mm$^2$ to 78.540 mm$^2$, preferably 0.071 mm$^2$ to 19.635 mm$^2$, particularly preferably 0.196 mm$^2$ to 7.069 mm$^2$.

The at least one partial passage can have a length (L) and a minimum diameter (D), which length (L) is in a ratio (L/D) of smaller than 2 (<2) relative to the minimum diameter (D).

In that case, that vertical orientation can be interpreted as meaning that the apparatus in a position of use, with plasticized material being passed through the apparatus, is oriented vertically.

The "at least vertically oriented partial passage" is to be interpreted as meaning that the partial passage is at least portion-wise oriented vertically and/or has such a vertical inclination so that expansion is possible in free fall into the free space.

Preferably, the apparatus is in the form of a feed apparatus for an injection unit for a shaping machine, the injection unit preferably having a barrel cylinder and/or an injection element.

An injection element can be for example in the form of an injection screw or injection plunger.

The term shaping machines can be used to denote injection molding machines, injection presses, presses and the like. Shaping machines in which the plasticized material is fed to an open mold tool can certainly be envisaged.

The plasticized material can be passed from a plasticizing unit into the apparatus by a connection.

Plasticising screws (double-screw extruders or plasticising unit with only one plasticizing screw) can be used as the plasticizing unit. Other structural variants of plasticizing units from the state of the art can certainly also be envisaged, which for example plasticize a material to be plasticized only by the feed of heat.

Preferably, the connection for feeding the plasticized material into the apparatus is air-tight or sealed in relation to the plasticized material with respect to the environment.

There is preferably at least one evacuation device—preferably in the region of the free space, adapted to carry gases out of the apparatus in the region of the free space.

Preferably, the feed device has at least one further inlet opening—preferably in the region of the free space —, wherein at least one additive and/or a further plasticizable material can be fed to the plasticized material by way of the at least one further inlet opening.

By way of example additives which modify the physical or also the chemical properties of the plasticized material (for example the color or the chemical resistance) can be fed by way of the at least one further inlet opening. Such examples are hardeners, fiber materials, dye components, plasticizers, fillers, stabilizers or the like.

At least one measuring device—preferably in the region of the free space —, can be provided which is adapted to determine a viscosity and/or temperature and/or color and/or flow speed of the plasticized material.

For example, the measuring device can be in the form of an optical measuring device. Other measuring devices like for example temperature sensors can however certainly also be envisaged.

At least one melt filter can be provided—preferably in the flow direction of the plasticized material upstream of the inlet opening. The use of suitable melt filters can make it possible for example to filter impurities or non-plasticized particles out of the plasticized material.

Preferably, the partial passages open into a free space at an angle of between 0 and 90 degrees in relation to the horizontal. It can thus be provided that the partial passages guide the mass flow of plasticized material vertically downwardly into the free space so that it passes into the free space in free fall. Alternatively or in addition, however, the mass flow of plasticized material passes into the free space horizontally, vertically upwardly or at any other angle.

Protection is also claimed for a plasticizing assembly for a shaping machine comprising
  a plasticizing unit,
  an injection unit, and
  at least one apparatus according to the invention, wherein an outlet opening of the plasticizing unit for plasticized material is connected in flow relationship to the inlet opening of the apparatus and the free space of the apparatus is connected in flow relationship to a barrel cylinder of the injection unit.

An injection unit can have for example a barrel cylinder and/or an injection element.

A plasticizing unit of a shaping machine can be formed for example by a plasticizing screw, a plasticizing extruder, a double extruder or other compound apparatuses.

Protection is also claimed for a shaping machine comprising at least one apparatus according to the invention and at least one above-discussed plasticizing unit with an apparatus according to the invention.

A method of degassing a plasticizable material can include:
  plasticized material is fed to at least one passage by way of an inlet opening,
  a material flow flowing through the passage is split up into partial flows by partial passages in a flow direction of the plasticized material downstream of the at least one passage, and
  is passed into a free space by way of the partial passages, wherein the plasticized material expands in the free space,
  wherein the plasticized material when flowing through at least one of the partial passages is viscoelastically loaded by a taper so that a larger strand enlargement occurs.

The increase in the strand enlargement is naturally to be interpreted in relation to a structural variant which is without a taper.

A viscoelastic loading increases the energy level of the plasticized material by a mechanical action, by for example the pressure and/or the flow speed of the plasticized material being increased when passing through the taper.

BRIEF DESCRIPTION OF THE FIGURES

Further examples, advantages and details of the invention are set forth in the specific description hereinafter and illustrated in the Figures in which:

FIGS. 3a-3g show various variants of a taper, and

FIG. 4 shows a shaping machine with an embodiment of an apparatus according to the invention.

DETAILED DESCRIPTION OF THE INVENTION

Figure 1:
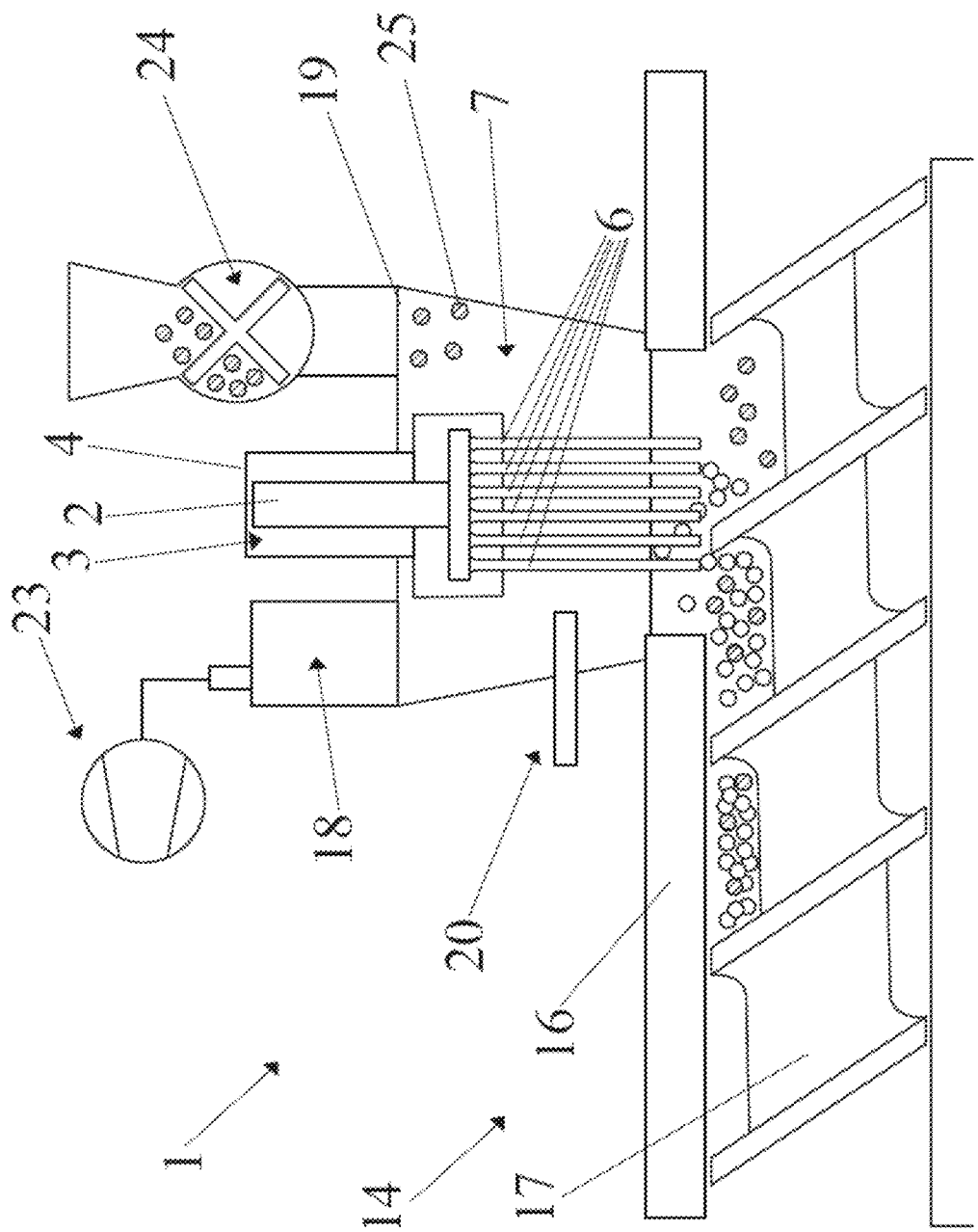
FIG. 1 shows a first embodiment of an apparatus according to the invention.

FIG. 1 shows a first embodiment of an apparatus 1 according to the invention, wherein a plasticized material 2 can be fed to the apparatus 1 by way of a passage 3.

That passage 3 passes the plasticized material 2 in a vertical direction to the partial passages 6.

The plasticized material 2 can be fed to the apparatus 1 by way of the inlet opening 4 to the passage 3, wherein the plasticized material 2 can be passed to the inlet opening 4 for example from a plasticizing unit 21.

After the plasticized material 2 has been transferred from the passage 3 into the partial passages 6 the mass flow of the plasticized material 2 is distributed to the partial passages 6 from the passage 3.

The partial passages 6 end in a free space 7, in which case the plasticized material 2 transitions in free fall vertically into the free space 7, in which case the transition out of the partial passages 6 into the free space 7 affords a strand enlargement of the plasticized material 2, as is later illustrated and discussed in more detail in FIGS. 2 and 3a-3g.

By virtue of the strand enlargement and the simultaneous viscoelastic relief of load on the plasticized material 2 gas dissolved in the plasticized material at the beginning forms bubbles which escape from the plasticized material 2 in free fall through the free space 7. A similar thing occurs with gas already previously included in the plasticized material in bubble form.

The gas removed from the plasticized material in that way is then present in the free space 7.

The gases which are degassed from the plasticized material 2 can be carried away from the free space 7 by way of the evacuation device 18.

The evacuation device 18 operates by means of a suction removal pump 23.

Alternatively the gases removed from the plasticized material can escape passively from the free space 7.

In a condition of free fall or flowing into the free space 7 the plasticized material 2 is fed from the partial passages 6 to an injection unit 14 of a shaping machine 15, wherein the plasticized material is fed through an opening in a barrel cylinder 16 to the injection unit 17 which is in the form of an injection screw (actually: it drops on to same).

The apparatus further has a feed device 24, by means of which an additive 25 or a further plasticizable material can be fed to the plasticized material 2 by way of the further inlet opening 19 and the free space 7 in order then to be blended together jointly with the plasticized material in the injection unit 17 (more precisely: the injection screw).

A measuring device 20 is also arranged in the free space 7, in the form of an optical measuring device 20.

A state and/or a flow rate and/or a color of the plasticized material 2 can be determined by way of the optical detection of that measuring device 20.

Thus it is for example certainly conceivable that a color of the plasticized material 2 is detected by way of the optical measuring device 20, in which case a closed-loop controlled amount of additives 25 for coloring the plasticized material 2 could be fed into the free space 7 under the control of the feed device 24.

In order to promote the strand enlargement effect of the plasticized material 2 on issuing from the partial passages 6 into the free space 7 the partial passages 6 in this embodiment have a constriction or taper 8, as is described in greater detail with reference to FIG. 2.

Figure 2:
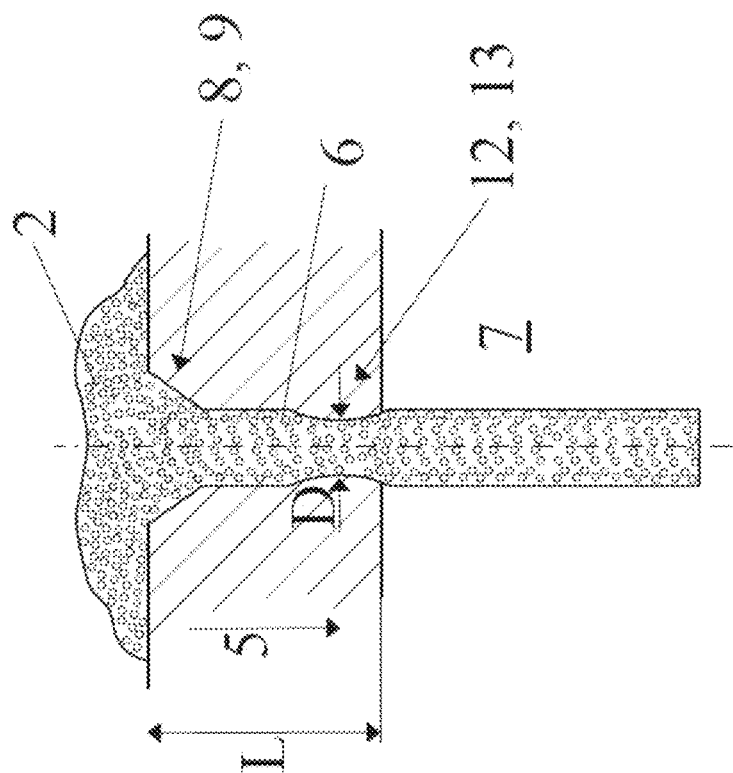
FIG. 2 shows a first embodiment of a taper.

FIG. 2 represents an enlarged detail view of a partial passage 6 from FIG. 1, with plasticized material 2 being passed through the partial passage 6 in the flow direction 5.

In this embodiment the flow direction 5 of the plasticized material 2 corresponds to the longitudinal direction of the partial passage 6 and in addition a vertical direction in an operating state of the apparatus 1.

The partial passage 6 of the embodiment in FIG. 2 has a taper 9 formed by a conical region 9. That conical region which tapers in the flow direction 5 leads to viscoelastic stressing of plasticized material 2, which promotes strand enlargement at the transition into the free space 7 of the plasticized material 2.

The strand enlargement provides that the surface of the plasticized material 2 is torn open on issuing from the partial passage 6 and gasses dissolved in the plasticized material 2 are liberated, leading to degassing of the plasticized material 2.

That flow behavior on the part of the plasticized material 2 can thus ideally be used to degas the plasticized material 2, in which case more dissolved gasses can be extracted from the plasticized material 2, the correspondingly greater that the strand enlarges.

In order further to promote that effect the FIG. 2 embodiment has a further taper 12 which is afforded by the rounded recess 13.

That rounded recess 13 leads to a further (dynamic) viscoelastic loading of the plasticized material 2 and thus increases the effect of strand enlargement when the plasticized material 2 issues from the partial passage 6 into the free space 7.

In this embodiment the rounded recess 13 is of a cross-section in the shape of a segment of a circle. It will be appreciated that other cross-sectional shapes are certainly conceivable, for example a segment of an ellipse or more generally of an oval. In that respect it is not absolutely necessary that the cross-section is symmetrical in relation to a horizontal axis in FIG. 2. For example it would also be possible to use a segment of a kidney-shaped cross-section.

The partial passage 6 in this embodiment has a minimum diameter D (in a horizontal cross-section through the further taper 12) and a length L (along the flow direction 5 or the longitudinal axis 11).

Figure 3A:
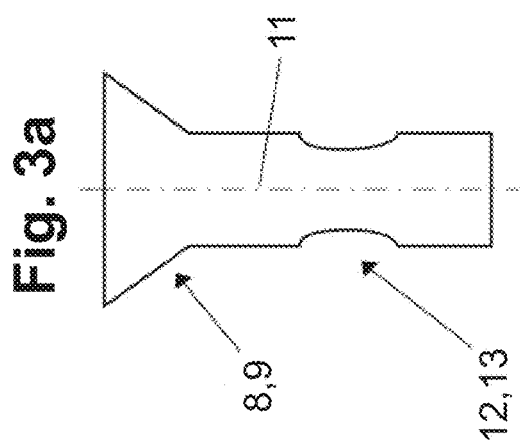

FIGS. 3a through 3d show different alternative variants of the partial passage 6, while FIG. 3a shows the variant of FIG. 2 once again.

Figure 3B:
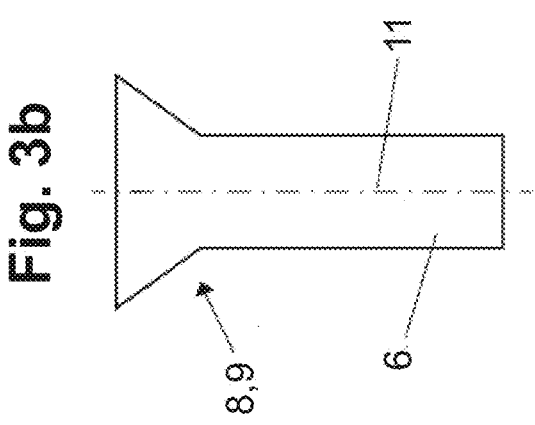

The variant in FIG. 3b represents a partial passage 6 which has only one taper 8 in the form of a conical region 9.

Figure 3C:
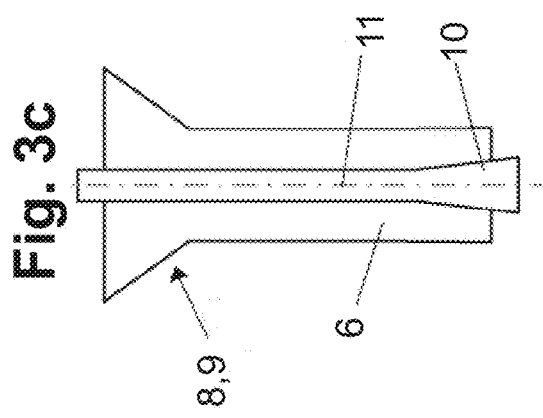

This variant in FIG. 3b can be expanded by a mandrel or torpedo arranged centrally in the interior of the partial passage 6, as shown by FIG. 3c.

The mandrel 10 can cause an additional open surface in respect of the plasticized material 2, and that in turn serves for better degassing.

It has proven to be particularly desirable if that mandrel 10 is provided in a lower region with fins (as can be seen from FIG. 3c) which knife-like cut up the plasticized material 2 after issuing from the at least one partial passage 6 and thus promote the escape of gas from the plasticized material 2.

It is certainly conceivable for the mandrel 10 to be of a configuration with a conical enlargement (as indicated by FIG. 3c), in which case it is possible to promote "swelling" of the plasticized material 2 on issuing from the partial passage 6.

Figure 3D:
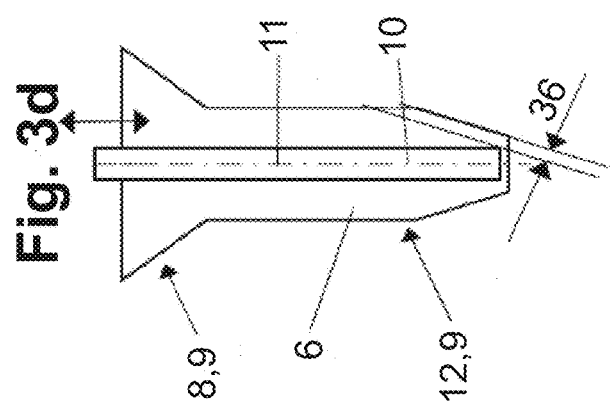

As shown in FIG. 3d however it can also be provided that a partial passage 6 has a first taper 8 and a further taper 12, wherein the taper 8 and the further taper 12 are respectively afforded by way of a conical region 9 which decreases along the flow direction 5. The further taper 12 also dynamically enhances the viscoelastic loading on the plasticized material shortly before issuing into the free space 7.

The mandrel 10 can be without fins, as can be seen from FIG. 3d.

It can advantageously be provided that the mandrel 10 is mounted moveably along the longitudinal axis 11 and is moveable and/or can be arrested in its position. That adjustment possibility can provide that a gap 36 is adjustable between the mandrel 10 and the inside wall of the partial passage so that adjustment can be effected individually (depending on the respective material to be processed as the plasticized material 2).

Further structures are also conceivable in relation to the configuration of the partial passages 6. For example the further taper 12 and/or the rounded portion 13 could be implemented by a thickening on the mandrel 10.

It can also be provided that the mandrel 10 has an injection nozzle device at the end (see in that respect also FIG. 3g), whereby a fluid 37 (for example a gas) can be fed to the plasticized material 2. Such an injection nozzle device can be for example in the form of a tube by a suitable configuration of the mandrel 10.

The feed of gases by way of the mandrel 10 can additionally increase or promote the "swelling" of the plasticized material 2 on issuing from the partial passage 6.

In addition additives (for example in the form of a propellant gas) can be fed to the plasticized material 2 by the feed of gases by way of the mandrel 10, like for example aromatic substances or entrainment agents. By way of example active gases like $CO_2$ can be used to bind fragrances dissolved in the plasticized material.

By way of example fluid additives or additions (like hardeners, plasticizers, dyestuffs and so forth) could be fed by way of an injection nozzle device of the at least one mandrel 10, which would afford the substantial advantage that the plasticized material encloses the added fluid additive or addition (which for example on the one hand is advantageous for thorough mixing of the plasticized material with the fluid additive or addition while on the other hand preventing uncontrolled spread—splashing around—of the fluid additives or additions in the feed in the free space).

Figure 3E:
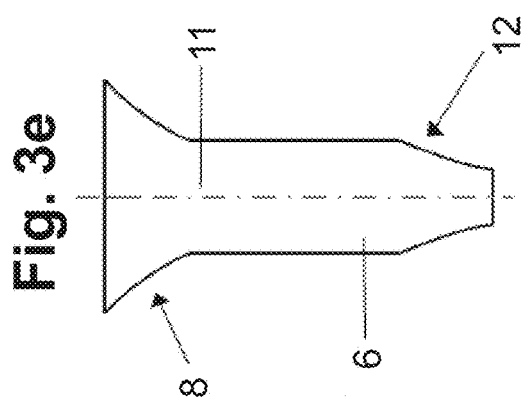

FIG. 3e shows a configuration in which the partial passage 6 has a first taper 8 and a further taper 12, wherein the taper 8 and the further taper 12 are respectively provided by way of a rounded region which reduces along the flow direction 5. The further taper 12 also dynamically increases the viscoelastic loading of the plasticized material shortly before issuing into the free space 7.

Those rounded narrowing regions 8, 12 can be for example in accordance with a hyperbolic function of the cross-section along their longitudinal axis so that a strain rate of the plasticized material 2 is kept constant along the narrowing regions 8, 12.

Figure 3F:
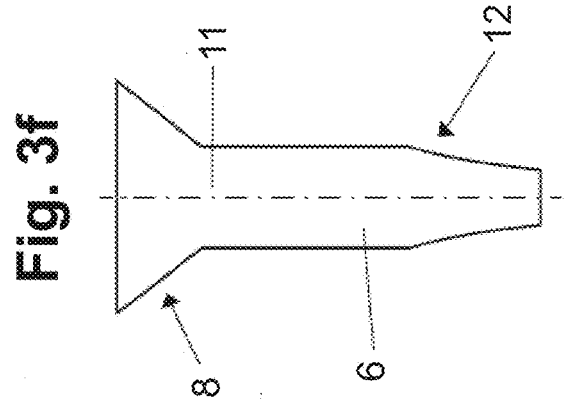

FIG. 3f shows a variant of the partial passage 6 in which the first narrowing region 8 is in the form of a conical region 9 and the narrowing second region 12 is of a rounded configuration.

FIG. 4 shows a shaping machine 15 having a plasticizing assembly 22 which has an embodiment of an apparatus 1 according to the invention.

FIG. 4 diagrammatically shows a shaping machine 15. That shaping machine 15 has a plasticizing assembly 22 and a closing unit 26, which are also arranged on a machine frame 27.

The closing unit 26 has a stationary mold mounting plate 28, a moveable mold mounting plate 29 and an end plate 30.

In contrast to the illustrated horizontal three-plate machine the closing unit 26 could also be in the form of a two-plate machine or a vertical machine.

The moveable mold mounting plate 28 is moveable relative to the machine frame 27 by way of a drive device 31. Such a drive device 31 can for example have a toggle lever mechanism.

Mold halves of a shaping tool 32 can be mounted or fitted to the fixed mold mounting plate 28 and the moveable mold mounting plate 29 (this is shown in broken line).

The illustrated shaping tool 32 which is closed in FIG. 4 has at least one cavity. An injection passage, by way of which a plasticized material of the plasticizing assembly 22 can be fed, leads to the cavity.

The plasticizing assembly 22 has a continuous plasticizing unit 21 which is in the form of a single-screw extruder and by way of which a recycling material can be supplied. The plasticizing unit 21 plasticizes the material to be plasticized and passes the plasticized material by way of a melt filter 33 into an apparatus 1 for degassing the plasticized material.

That apparatus 1 can be implemented for example like the apparatus 1 shown in FIG. 1.

Subsequently to the apparatus 1 for degassing the plasticized material 2 the plasticized material 2 is fed to the injection unit 14, wherein the plasticized material 2 is passed through an opening in a barrel cylinder 16 to the injection unit 17 in the form of a single-screw injector.

The injection unit 17 in this embodiment has a barrel cylinder 16 and an injection screw arranged therein. That injection screw is rotatable about its longitudinal axis and is moveable axially in the injection direction along the longitudinal axis.

Those movements are initiated by way of a diagrammatically illustrated drive unit 35. Preferably the drive unit 35 includes a rotary drive for the rotary movement and a linear drive for the axial injection movement.

The plasticizing assembly 22 is connected in signal-conducting relationship to an open-loop or closed-loop control unit 34. Control commands are output to the plasticizing assembly 22 by the open-loop or closed-loop control unit 34.

The open-loop or closed-loop control unit 34 can be connected to an operating unit or can be an integral component part of such an operating unit.

The apparatus 1 according to the invention makes it possible to degas a plasticized material 2 (for example a recycled material) which is charged with unwanted gases, in such a way that it can be used for example in a per se known injection molding process for the production of moldings so that the unwanted gases have no or at least a significantly reduced influence on the moldings.

LIST OF REFERENCES 1 apparatus
2 plasticized material
3 passage
4 inlet opening
5 flow direction
6 partial passage
7 free space
8 taper
9 conical region
10 mandrel
11 longitudinal axis
12 further taper
13 rounded recess
14 injection unit
15 shaping machine
16 barrel cylinder
17 injection unit
18 evacuation device
19 further inlet opening
20 measuring device
21 plasticizing unit
22 plasticizing assembly
23 suction pump
24 feed device
25 additive
26 closing unit
27 machine frame
28 fixed mold mounting plate
29 moveable mold mounting plate
30 end plate
31 drive device
32 mold tool
33 melt filter
34 open-loop or closed-loop control unit
35 drive unit
36 gap
37 fluid

The invention claimed is:

1. An apparatus for degassing a plasticizable material, comprising:
at least one essentially vertical passage having a first inlet opening for a feed of the material in a plasticized state;
a plurality of substantially parallelly arranged vertical partial passages downstream of the at least one essentially vertical passage in a flow direction of the plasticized material so that a material flow flowing through the at least one essentially vertical passage is split up into partial flows by the vertical partial passages,
wherein the vertical partial passages open directly into a free space such that the plasticized material of the partial flows free-falls vertically from the partial passages into the free space, the free space having a vertical dimension which allows strands of the plasticized material to enlarge during free-fall such that gas dissolved in the plasticized material is released in the free space; and
a feed device having a second inlet opening, wherein the second inlet opening is provided in a region of the free space, and the feed device is configured to feed at least one additive or a further plasticizable material to the plasticized material via the second inlet opening,
wherein at least one of the partial passages has a taper.

2. The apparatus as set forth in claim 1, wherein the taper has a conical region or a rounded protrusion.

3. The apparatus as set forth in claim 2, wherein the taper has the conical region, and the conical region tapers in the flow direction of the plasticized material.

4. The apparatus as set forth in claim 1, wherein at least one of the partial passages has a longitudinal axis and a mandrel which is oriented substantially parallel to the longitudinal axis.

5. The apparatus as set forth in claim 4, wherein lateral surfaces project from the mandrel along the flow direction of the plasticized material.

6. The apparatus as set forth in claim 5, wherein the lateral surfaces project from the mandrel in the flow direction of the plasticized material at an end of the mandrel.

7. The apparatus as set forth in claim 4, wherein the mandrel has at least one injection nozzle device, and wherein a fluid can be fed to the plasticized material by way of the at least one injection nozzle device.

8. The apparatus as set forth in claim 4, wherein a gap is formed between the mandrel and the at least one of the partial passages having the mandrel, and wherein the gap has a size of 0.05 mm to 3 mm.

9. The apparatus as set forth in claim 8, wherein the mandrel is mounted moveably along the longitudinal axis and is moveable or can be arrested in its position.

10. The apparatus as set forth in claim 9, wherein the size of the gap is adjustable to a size in a range of 0.05 mm to 3 mm.

11. The apparatus as set forth in claim 8, wherein the gap is an annular gap and has a size of 0.5 mm to 1 mm.

12. The apparatus as set forth in claim 4, wherein in the at least one of the partial passages having the mandrel, the mandrel is centrally arranged in the at least one of the partial passages.

13. The apparatus as set forth in claim 1, wherein the at least one of the partial passages has a further taper.

14. The apparatus as set forth in claim 13, wherein the further taper has a conical region or a rounded protrusion.

15. The apparatus as set forth in claim 1, wherein a projection is arranged transversely to the flow direction in the free space of the apparatus downstream in the flow direction of at least one of the partial passages.

16. The apparatus as set forth in claim 15, wherein the projection is configured to cut open a strand of the plasticized material falling from the at least one of the partial passages.

17. The apparatus as set forth in claim 1, wherein the free space is gas-tight in relation to an environment of the apparatus.

18. The apparatus as set forth in claim 1, wherein the at least one of the partial passages has a minimum diameter of 0.2 mm to 10 mm.

19. The apparatus as set forth in claim 18, wherein the at least one of the partial passages has a minimum diameter of 0.3 mm to 5 mm.

20. The apparatus as set forth in claim 19, wherein the at least one of the partial passages has a minimum diameter of 0.5 mm to 3 mm.

21. The apparatus as set forth in claim 1, wherein the at least one of the partial passages has a length and a minimum diameter, and wherein the length is in a ratio of smaller than 2 relative to the minimum diameter.

22. The apparatus as set forth in claim 1, wherein the at least one of the partial passages viewed in the flow direction has a polygonal cross-sectional shape.

23. The apparatus as set forth in claim 22, wherein the at least one of the partial passages viewed in the flow direction has a rectangular cross-sectional shape.

24. The apparatus as set forth in claim 1, wherein the apparatus is in the form of a feed device for an injection unit for a shaping machine.

25. The apparatus as set forth in claim 1, further comprising at least one evacuation device adapted to carry gases out of the apparatus in a region of the free space.

26. The apparatus as set forth in claim 1, further comprising at least one measuring device provided in a region of the free space, wherein the at least one measuring device is adapted to determine a viscosity or a temperature or a color or a flow speed of the plasticized material.

27. The apparatus as set forth in claim 1, wherein the partial passages open into the free space at an angle of between 0 degrees and 90 degrees in relation to a horizontal direction.

28. A plasticizing assembly for a shaping machine comprising:
   a plasticizing unit;
   an injection unit; and
   the apparatus of claim 1, wherein an outlet opening of the plasticizing unit for plasticized material is connected in a flow relationship to the first inlet opening of the apparatus and the free space is connected in a flow relationship to a barrel cylinder of the injection unit.

29. A shaping machine comprising the plasticizing assembly as set forth in claim 28.

30. A method of degassing a plasticizable material using the apparatus as set forth in claim 1, the method comprising:
   feeding plasticized material to the at least one essentially vertical passage by way of the first inlet opening;
   splitting the material flow flowing through the at least one essentially vertical passage up into partial flows by the vertical partial passages in a flow direction of the plasticized material downstream of the at least one essentially vertical passage; and
   passing the material flow flowing through the at least one essentially vertical passage into the free space by way of the vertical partial passages, wherein the plasticized material expands in the free space,
   wherein the plasticized material when flowing through at least one of the vertical partial passages is viscoelastically loaded by a taper so as to increase a strand enlargement which occurs in the free space relative to a strand enlargement which would occur in the absence of the taper.

* * * * *